(No Model.)
W. SCOTT.
WINDMILL MOTOR.
No. 261,051. Patented July 11, 1882.
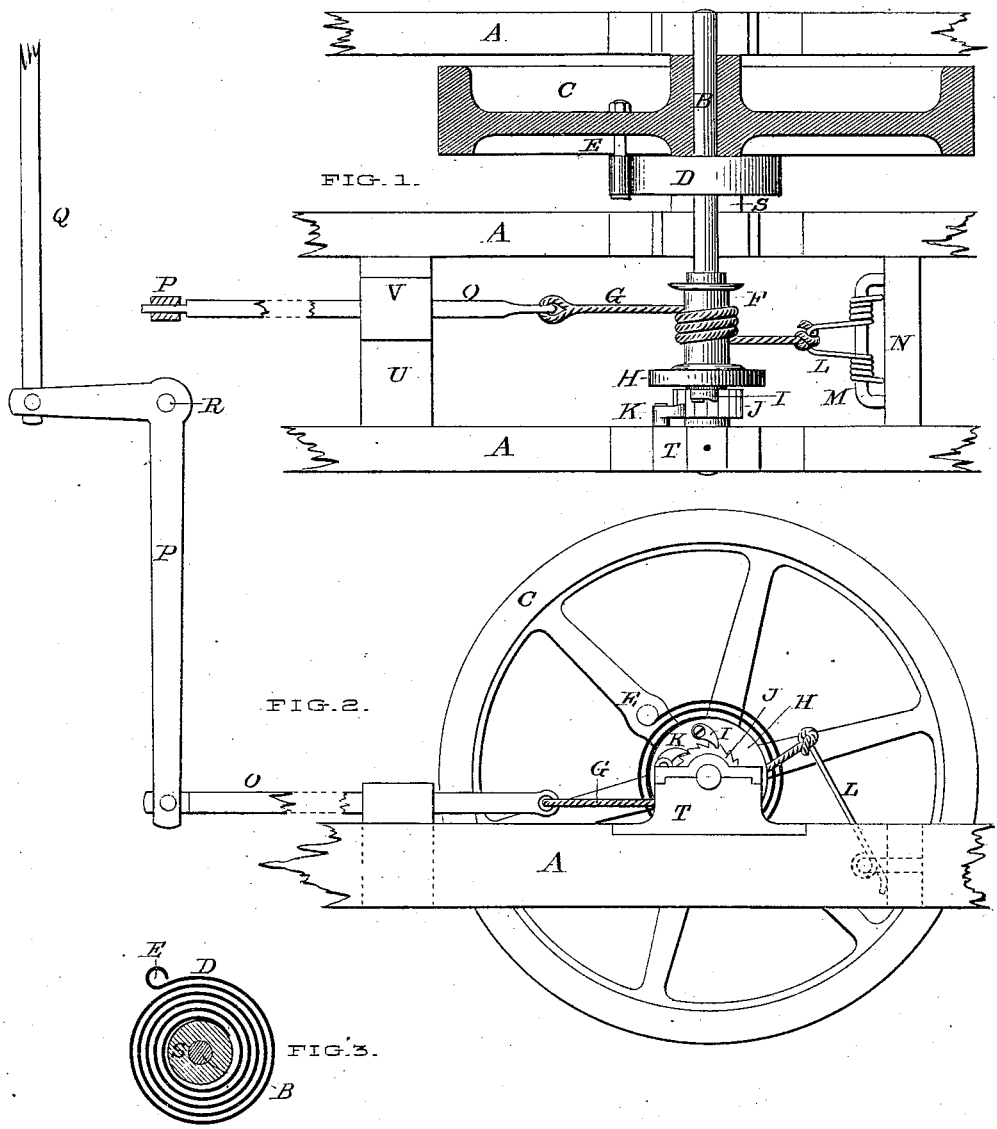
WITNESSES:
Charles A. Cheney
Edward Mathews
INVENTOR:
Walter Scott
N. PETERS, Photo-Lithographer, Washington, D. C.

UNITED STATES PATENT OFFICE.

WALTER SCOTT, OF HOOSICK FALLS, NEW YORK.

WINDMILL-MOTOR.

SPECIFICATION forming part of Letters Patent No. 261,051, dated July 11, 1882.

Application filed March 6, 1882. (No model.)

*To all whom it may concern:*

Be it known that I, WALTER SCOTT, of the village of Hoosick Falls, county of Rensselaer, and State of New York, have invented certain new and useful Improvements in Methods of Changing Reciprocating into Rotary Motion in Motors; and I do declare the following to be a full, clear, and exact description thereof, reference being had to the accompanying drawings, making a part of this specification, in which—

Figure 1 is a plan view. Fig. 2 is a side elevation of the same. Fig. 3 is a vertical section of the spring and the manner of attaching the same to the main shaft.

Similar letters of reference indicate corresponding parts in the several figures.

The application of my invention is made in this specification to windmills, and especially to that class of windmills generally used for pumping. The same can be applied to other motors where the power is variable in quantity; but for the purpose of making this specification more simple, and therefore more readily understood, I will describe the same as attached to this class of windmill-motors.

I am aware that in this class of motors devices have been used to convert reciprocating into rotary motion when rotary motion is required to drive machinery—for example, a circular saw—but none, to my knowledge, have been effectual, for the reason that the power is more variable than any other and not controllable, like water and steam, by the ordinary form of regulator. The varying gusts of wind—sometimes very severe for a time, and then suddenly slacking to a slight breeze—prevents anything approaching a steady motion, and is liable to break the machinery, especially in the class above referred to—namely, reciprocating motion. To obviate these difficulties I employ a spring placed between the driving and driven parts of the machine, so that when there is a surplus of motion on the wind-wheel, which gives a corresponding surplus of power and motion to the driven machinery, the surplus power is exerted on the spring to wind it up, and the force of the spring so wound up is available to drive the machinery when the wind lulls.

Q represents the lower portion of the pitman-rod of the windmill, the lower end of which is attached by a joint to the short arm of the crank-shaped lever P, which is pivoted at R to some portion of the frame-support of the windmill-tower or some other fixed support. The lower end of long arm of crank-lever P is pivoted to a rod, O. This rod O may be of any desired length, to suit the location of the machinery shown in Figs. 1 and 2. The rod is shown in Figs. 1 and 2 as broken off, so that its connection to the other parts may be longer or shorter, as desired. In place of the rod O, any flexible material may be used—as a wire or wire rope, which should be sufficiently strong and not liable to stretch—and when made of the flexible material it is not necessary to run in a direct straight line, but by means of sufficient pulleys or other guiding and supporting devices can be used in a devious course, so that, the windmill itself always being fixed in one place, the machinery for imparting the rotary motion can be used in different places, if desired.

A A A are the side sills of the frame-work, shown broken off at both ends, the main end sills not being shown.

U and N are girts which join two of the sills A A.

B is a shaft which turns loosely in bearings on sills A A A.

On one end of the shaft B is loosely mounted the fly or belt wheel C, and in close proximity to the hub of the fly-wheel C, on the shaft B, is mounted a coiled spring, D. This spring is attached firmly at the end of its inner coil to a circular hub or disk, S, Fig. 3, which is fast to shaft B, as shown. The end of the outer coil of spring D is made in hook form, as shown at E, and is attached to a pin projecting from one of the arms or inner side of the fly-wheel the requisite distance from the center to accommodate the diameter of the coiled spring D. On the other end of the shaft B is mounted a drum, F, which turns loosely on the shaft B.

To the end of the rod O is attached a flexible rope, G, and this rope is passed back and wound around the drum F one or more times, as may be necessary, and the other end of this rope is fastened to a yielding spring, L, which is connected to girt N through the intervention of a staple, M. This spring, when drawn upon by the rope G, will yield toward the drum F. This spring may be made in any other of the well-known forms of springs to accomplish the purpose.

On one end of the drum F is cast a disk, H, of sufficient diameter to receive a pawl, I, on one side near its periphery. The same result will be obtained by a crank of the same throw as the diameter of the disk. Pivoted to the frame, just inside the box T, is a second pawl, and on shaft B, between disk H and sill A, is placed a ratchet-wheel, J, firmly attached to shaft B, and turns with it. This ratchet-wheel is made wide enough to receive into its ratchet-teeth, running across its face parallel to shaft B, both pawls I and K and allow them to pass each other as the ratchet-wheel revolves.

The operation of the machine is as follows: Supposing the pitman Q is at its lowest position and the revolution of the wind-wheel draws it up through the intervention of a crank in the well-known manner, an oscillating motion is imparted to the crank-lever P about the center R, and through the pivot at the lower end imparts a reciprocating motion to the rod O, moving it toward the left, as shown in the drawings. This movement pulls on the rope G and unwinds it from the drum F, thus imparting a rotary motion to the drum, and thereby winding that portion of the rope in rear of the drum onto the drum at the opposite end of the coil, the spring L yielding sufficiently to allow the rope to thus wind up.

When the pitman Q has reached its highest point and begins to descend the rod O moves in the other direction, the rope G becomes slack, and the tension of the spring L pulls on that end of the rope to which it is fastened and unwinds the rope which was before wound on, and winds back the rope which was in the former opposite motion of the rod O unwound, thus turning the drum F in the opposite direction, whereby the same length of rope is unwound from and wound onto drum F, and drum F makes the same amount of revolution in both directions at every complete revolution of the wind-wheel. When the rotary motion of the drum F is toward the spring L the pawl I on disk H engages with one end of teeth of ratchet J and communicates a rotary motion to shaft B, which turns the hub S, to which the inner end of coiled spring D is attached, and partially winds up the spring, the pawl K slipping by the other end of its ratchet-teeth. When this rotary motion of drum F ceases the pawl K engages with the ratchet-teeth, or one of them, and holds the shaft B from turning back through the force of the spring. The spring L then causes the rope to unwind from the end of the coil to which it is attached and to wind up the other end, thus giving motion in an opposite direction to drum F, the pawl I slipping out of engagement with the ratchet-tooth in which it was engaged and slipping over those next to it until the slack rope is taken up and this motion ceases, and the motion in the other direction is repeated by the same means as before. When the spring D is sufficiently wound up to overcome the inertia of fly-wheel C and the friction of its bearing on the axle or shaft B, the fly-wheel C, being connected to the outer end of the coiled spring D, will turn and preserve a continuous rotary motion when there is sufficient wind to turn the wind-wheel, and when sufficient force is accumulated through the winding up of the coiled spring the fly-wheel can be made, through a belt on its face, or any other well-known attachment, to give motion to machinery within the limit of its capacity.

It is plain that the length of stroke of the rod O may be varied by changing the relative lengths of the arms of the crank-lever P. In the drawings I have represented the short arm about one-third the length of the long arm, and the long arm can be made with a series of holes to receive the pin or bolt that connects it with rod O, by which its length can be adjusted.

The diameter of the drum should be made to correspond relatively with the extent of the throw of the rod O, or nearly so. I prefer to make it of such size as to give it at least one complete revolution.

Having thus fully described my invention, what I claim as new, and desire to secure by Letters Patent, is—

1. In combination with shaft B and drum F, turning loosely thereon, fly-wheel C, turning loosely and connected to shaft B by a spring, substantially as and for the purpose specified.

2. The combination, with shaft B, fly-wheel C, and spring D, of the drum F, turning loosely on shaft B and connected to rod O by a rope or other flexible connection, substantially as and for the purpose specified.

3. In combination with the shaft B and revolving drum F loose thereon and adapted to revolve back and forth, the ratchet-wheel J and pawls I and K, substantially as and for the purpose specified.

WALTER SCOTT.

Witnesses:
CHARLES A. CHENEY,
EDWARD MATHEWS.